United States Patent Office 2,791,575
Patented May 7, 1957

2,791,575

OLEFIN POLYMERIZATION WITH GROUP V METAL OXIDE AND ALKALI METAL HYDRIDE

Morris Feller, Park Forest, and Edmund Field, Chicago, Ill., assignors to Standard Oil Company, Chicago, Ill., a corporation of Indiana No Drawing. Application February 1, 1954, Serial No. 407,562

20 Claims. (Cl. 260—94.9)

This invention relates to a novel process for the polymerization of ethylene in the presence of alkali metal hydrides and subgroup 5 metal oxide catalysts.

One object of our invention is to provide novel and highly useful catalysts and promoters for the preparation of high molecular weight polymers from ethylene-containing gas mixtures. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous monoolefin such as propylene, to provide novel resinous materials. These and other objects of our invention will become apparent from the ensuing description thereof.

Briefly, the inventive process comprises the conversion of ethylene principally to high molecular weight normally solid, resinous polymers and to grease-like polymers by contact with an alkali metal hydride (a hydride of Li, Na, K, Rb or Cs) and vanadia or other subgroup 5 metal oxide, preferably supported on a difficultly reducible metal oxide such as silica, activated alumina, titania, zirconia, clays, and the like. The inventive process is effected at temperatures between about 75° C. and about 325° C. and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. The conversion of ethylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to ethylene polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough, resinous ethylene homopolymers having an approximate specific viscosity ($\times 10^5$) of 10,000 to more than 300,000 [($\eta$ relative$-1) \times 10^5$]. By the term "tough, resinous polyethylene" as used herein we mean polymer having a brittle point below $-50°$ C. (A. S. T. M. Method D746–51T), impact strength greater than two foot pounds per inch of notch (A. S. T. M. Method D256–47T–Izod machine) and minimum elongation at room temperature (25° C.) of 100%.

The process of the present invention may be employed to effect the copolymerization of ethylene with other polymerizable materials, particularly with propylene, or other mono-olefinic hydrocarbons such as n-butylenes, isobutylene, t-butylethylene; acetylene, butadiene, isoprene, and the like, usually in proportions between about 1 and about 25% by weight, based on the weight of ethylene.

The proportion of sodium hydride or other alkali metal hydride to subgroup 5 metal oxide catalyst (total weight of solid catalyst) may be varied between about 0.05 and about 2.5 parts by weight, but is usually between about 0.5 to about 1 part by weight per part by weight of the subgroup 5 catalyst. The optimum proportions can be readily determined in specific instances by simple small-scale tests.

The relative proportion of support to the catalytic metal oxide is not critical and may be varied throughout a relatively wide range such that each component is present in amounts of at least approximately 1 weight percent. The usual metal oxide:support ratios are in the range of about 1:20 to 1:1, or approximately 1:10. We may employ conditioned silica-metal oxide catalysts composed of silica base containing about 1 to 80%, preferably about 5 to 35%, or approximately 10%, of vanadia or other subgroup 5 catalytic metal oxide supported thereon.

Gamma-alumina or other activated alumina, titania and zirconia may be used as supports in our catalysts. These may be prepared in any known manner and the oxides of vanadium or other subgroup 5 metal may likewise be incorporated in, or deposited on, the base in any known manner. The subgroup 5 metal oxide may be incorporated in the catalyst base in any known manner, e. g. by impregnation, coprecipitation, co-gelling, and/or absorption, and the catalyst base and/or finished catalysts may be heat stabilized in the known manners. Cobalt, calcium, magnesium, copper and zinc salts of vanadic acid may also be employed upon a difficultly reducible metal oxide support and are preferably treated with hydrogen under conditions to effect partial reduction thereof before use in our process.

The vanadia or other subgroup 5 metal oxide catalyst is subjected to a reducing or conditioning treatment before use in the polymerization process. The conditioning or reducing treatment is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute), to relatively high pressures up to 3000 p. s. i. g., or even more. The simplest reducing operation may be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The partial reduction of the metal oxide catalyst in which the metal is present in its pentavalent state can be effected in the presence of the alkali metal hydride promoter, prior to contacting the combination of catalysts with ethylene.

We have at times observed that an induction period before ethylene polymerization can be eliminated or substantially reduced by pressuring hydrogen into the reactor containing the solvent, ethylene, metal oxide catalyst and promoter, e. g. at hydrogen pressures between about 10 and about 900 p. s. i. g., preferably 100–400 p. s. i. g. Under these conditions only a small proportion of the ethylene is reduced to ethane.

Lithium aluminum hydride, an exceptionally active reducing agent, conditions and activates catalysts containing pentavalent subgroup 5 metal oxides even at temperatures as low as 35° F., although in general, temperatures between about 100 and about 300° C. can be employed. In practice, the catalyst is treated with a suspension of LiAlH₄ in a liquid hydrocarbon at weight ratios of about 0.2 to about 1 LiAlH₄ to solid catalyst. Sodium hydride (or sodium plus H₂) is effective in the reducing and conditioning treatment at temperatures above about 180° C. and may be employed in the same proportions as LiAlH₄. Calcium hydride may also be employed to effect some reduction of V₂O₅ supported on gamma-alumina at 230° C. and higher temperatures.

The conditioning treatment hereinabove described is desirable not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salts or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalyst can be employed in various forms and sizes, e. g., as powder, granules, microspheres, broken filter cake, lumps, or shaped pellets. A convenient form in which the catalyst may be employed is as granules of about 20–100 mesh/inch size range.

The charging stock to the present polymerization process preferably comprises essentially ethylene. The ethylene charging stocks may contain inert hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products. The molar ratio of ethylene to propylene may be varied over the range of about 0.1 to about 20. The charging stock may contain other components such as small amounts of hydrogen and it may contain other polymerizable materials such as butylene, acetylene, t-butylethylene, etc.

It is desirable to minimize or avoid the introduction of oxygen, carbon dioxide, water or sulfur compounds into contact with the catalyst.

In general, polymerization can be effected in the present process at temperatures between about 75 and about 325° C. Increasing the polymerization temperature tends to reduce the average molecular weight and density of the polymer produced by the process. Usually polymerization is effected in the present process at temperatures of at least about 175° C. or the preferred narrower range of about 225 to about 275° C. The conjoint use of polymerization temperatures between about 230 and about 260° C. and a liquid hydrocarbon reaction medium such as benzene, xylenes, decalin, or methyl decalins is highly desirable in producing ethylene polymers having specific viscosities ($\times 10^5$) ranging on the average from about 10,000 to about 30,000.

It has been found that the present process can be employed for the production of relatively high molecular weight ethylene polymers at relatively low pressures. The process of the present invention may be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g., about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes, or tetralin, or a cycloaliphatic hydrocarbon, such as decalin (decahydronaphthalene).

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers if preferably not such as to yield said solid polymers in quantitites which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between one-half and about 60 hours are usually employed and the reaction autoclave is charged with ethylene as the pressure falls as a result of the olefin conversion reaction.

The solvent:catalyst weight ratio can be varied in the range of about 5 to about 3000, or even higher for flow systems. The employment of high solvent:catalyst ratios, which is rendered possible by the presence of an alkali metal hydride, is very important in obtaining substantial yields of polymer.

The olefin charging stocks can be polymerized in the gas phase and in the absence of a liquid reaction medium by contact with the alkali metal hydrides and metal oxide catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is much preferred to effect the conversion of the olefin in the presence of a suitable liquid reaction medium. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalin and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquified hydrocarbon reaction medium, but it is highly desirable to add a viscosity-reducing hydrocarbon, such as those mentioned above, thereto in the reaction zone.

The liquid hydrocarbon reaction medium should be freed of poisons before use in the present invention by acid treatment, e. g., with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of 8 weight percent $MoO_3$—$Al_2O_3$ catalyst and $LiAlH_4$ (50 c. c. xylene—1 g. catalyst—0.2 g. $LiAlH_4$) at atmospheric pressure, followed by distillation of the xylenes. Still more effective purification of solvent can be achieved by heating it to about 225° C.–250° C. with either sodium and hydrogen or NaH plus an 8 weight percent molybdena-alumina in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

When solvents such as xylenes are employed, some alkylation thereof by ethylene can occur under the reaction conditions. The alkylate is removed with grease in the present process, can be separated therefrom by fractional distillation and can, if desired, be returned to the polymerization zone.

The methods of polymerization and equipment described in our application for United States Letters Patent, Serial No. 324,609 may be employed without substantial change in employing the present catalysts and promoters.

The following are non-limitative examples of our invention. The polymerization reactions were carried out in a 250 ml. stainless steel autoclave provided with a magnetically-actuated stirrup-type stirring device which was reciprocated within the reaction zone.

*Example 1*

The reactor was charged under a blanket of hydrogen gas with 100 cc. of purified toluene, 0.3 g. of lithium hydride and 1 g. of 10 weight percent $V_2O_5$ supported upon silica gel, 30 to 80 mesh per inch, which was prereduced before use with hydrogen at 350° C. and atmospheric pressure for 16 hours. The reactor contents were heated with stirring to 230° C. and ethylene was then pressured into the reaction mixture to an initial partial pressure of 670 p. s. i. Ethylene was repressured into the reactor from time to time as it was consumed. Reaction was continued for 44.5 hours, resulting in a total ethylene pressure drop of 620 p. s. i. The operation yielded 8.1 g. per g. of vanadia-silica catalyst of a tough, solid ethylene polymer having a density at 24° C. of 0.9590, Williams plasticity of 30.2 and melt viscosity of $8 \times 10^4$ poises (method of Dienes and Klemm, J. Appl. Phys. 17, 458–78 (1946)). The reaction also yielded 3.7 g. per g. of catalyst of solid grease-like polyethylenes and some alkylate toluene.

When the vanadia-silica catalyst was employed without any promoter, no solid ethylene polymer could be obtained, as shown by the following experiment. The autoclave was charged with 10 g. of 10 weight percent $V_2O_5$ supported on silica gel, about 40 to 100 mesh per inch, prereduced with hydrogen at 350° C. and atmospheric pressure for 16 hours. The reactor was also charged with 100 cc. of dehydrated and decarbonated toluene. The charging operations were performed under a hydrogen blanket. The contents of the reactor were then heated with stirring to 232° C. and ethylene was then introduced to an initial pressure of 775 p. s. i. The reactor contents were stirred for 20.5 hours. This reaction yielded no solid ethylene polymer; only 4 g. of a colored liquid were obtained.

As a further control test, a vanadia-alumina catalyst was employed in the absence of a promoter, as shown in the following experiment. The reactor was charged with 10 g. of 10 weight percent $V_2O_5$ supported upon a gamma-alumina, prereduced with hydrogen at 350° C. in the same manner as the aforementioned vanadia-silica catalysts. The reactor was charged with 50 cc. of dehydrated and decarbonated toluene and the contents were heated with stirring to 202° C. Ethylene was then introduced into the reactor to a partial pressure of 850 p. s. i. and stirring was continued for 22 hours. This reaction yielded only a trace amount of solid ethylene polymer.

*Example 2*

The reactor was charged under a blanket of hydrogen gas with 100 cc. of benzene which had been dried over sodium, 0.2 g. of sodium hydride and 1 g. vanadia-silica catalyst prepared as in Example 1. The contents of the reactor were heated with stirring to 230° C. and ethylene was then pressured into the reactor to an initial partial pressure of 510 p. s. i. Reaction was continued for 57 hours, ethylene being pressured into the reactor intermittently as it was consumed. The total ethylene pressure drop was 240 p. s. i. The operation resulted in the production of 2.40 g. per g. of vanadia-silica catalyst of solid polyethylenes having a density at 24° C. of 0.9586, Williams plasticity of about 17 and melt viscosity of about $10^4$ poises. The reaction also yielded 1.5 g. per g. of catalyst of solid grease-like polyethylenes and some alkylated benzene.

*Example 3*

The process of Example 1 is repeated but potassium hydride is substituted in one-tenth part by weight for the sodium hydride of Example 1 and the vanadia-silica catalyst is replaced by an equal weight of 10 weight percent of $Nb_2O_5$ supported upon an activated alumina, prereduced by the same technique as the vanadia-silica catalyst. The reaction products are worked up to separate solid polyethylenes.

*Example 4*

The reactor was charged under a blanket of hydrogen gas with 100 cc. of decalin which had been purified by treatment with silica gel, 0.5 g. of sodium hydride and 5 g. of 10 weight percent of $Ta_2O_5$ supported upon gamma-alumina, 30 mesh per inch, which was prereduced with hydrogen at atmospheric pressure for about 16 hours at 550° C. The contents of the reactor were heated with stirring in the presence of hydrogen to 299° C. and ethylene was then pressured into the reactor to an initial partial pressure of 975 p. s. i. Reaction was continued for 20 hours to yield 2.8 g. per g. tof tantala-alumina catalyst of solid polyethylenes. A decalin alkylate was also produced in the yield of about 0.24 g. per g. of catalyst.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, gas barriers, binders, etc. to even a wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about 0.01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer having a specific viscosity $\times 10^5$ of about 50,000 in about one liter of xylenes at a temperature close to the boiling point produces an extremely viscous solution.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected.

This application is a continuation-in-part of our application for United States Letters Patent, Serial No. 324,609 filed December 6, 1952, now U. S. Patent No. 2,726,231.

Having thus described our invention, what we claim is:

1. In a process for the production of a normally solid polymer, the steps of contacting ethylene with an alkali metal hydride and a catalyst comprising essentially an oxide of a metal of subgroup 5 of the periodic table at a polymerization reaction temperature between about 75° C. and about 325° C., and separating a normally solid polymer thus produced.

2. The process of claim 1 wherein the ratio of said alkali metal hydride to said catalyst, by weight, is between about 0.05 and about 2.5.

3. In a process for the production of a normally solid polymer, the steps of contacting ethylene with an alkali metal hydride and a catalyst prepared by treating a minor proportion of a subgroup 5 metal pentoxide supported upon a major proportion of a difficultly reducible metal oxide with a reducing gas at a temperature between about 350° C. and about 850° C. to produce catalyst comprising a lower-valent subgroup 5 metal oxide, and separating a normally solid polymer thus produced.

4. The process of claim 3 wherein said reducing gas is hydrogen.

5. The process of claim 3 wherein the ratio of alkali metal hydride to said catalyst, by weight, is between about 0.05 and about 2.5.

6. The process of claim 3 in which the polymerization reaction is effected in the presence of a liquid hydrocarbon reaction medium.

7. The process of claim 6 wherein said subgroup 5 metal pentoxide is $V_2O_5$.

8. The process of claim 6 wherein said subgroup 5 metal pentoxide is $Nb_2O_5$.

9. The process of claim 6 wherein said subgroup 5 metal pentoxide is $Ta_2O_5$.

10. The process of claim 6 wherein said alkali metal hydride is sodium hydride.

11. The process of claim 6 wherein said alkali metal hydride is lithium hydride.

12. The process of claim 6 wherein said alkali metal hydride is potassium hydride.

13. In a process for the production of a normally solid ethylene polymer, the steps which comprise contacting ethylene in a concentration between about 2 and about 10 weight percent in a liquid hydrocarbon reaction medium at a reaction temperature between about 200° C. and about 300° C. under pressure with an alkali metal hydride and a catalyst prepared by treating a minor proportion of a subgroup 5 metal pentoxide supported upon a major proportion of a difficultly reducible metal oxide with hydrogen under conditions adapted to effect partial reduction of said subgroup 5 metal pentoxide while supported upon said difficultly reducible metal oxide, said conditions including a temperature between about 350° C. and about 850° C., the weight ratio of said alkali metal hydride to said catalyst being between about 0.05 and about 2.5, and separating a normally solid ethylene polymer thus produced.

14. The process of claim 13 wherein said liquid hydrocarbon reaction medium is a low-boiling monocyclic aromatic hydrocarbon.

15. The process of claim 14 wherein said hydrocarbon is benzene.

16. The process of claim 13 wherein said alkali metal hydride is sodium hydride.

17. The process of claim 13 wherein said alkali metal hydride is lithium hydride.

18. The process of claim 13 wherein said alkali metal hydride is potassium hydride.

19. The process of claim 13 wherein said alkali metal hydride is sodium hydride and said metal pentoxide is $V_2O_5$.

20. The process of claim 13 wherein said alkali metal hydride is lithium hydride and said metal pentoxide is $V_2O_5$.

References Cited in the file of this patent
UNITED STATES PATENTS

| | | |
|---|---|---|
| 2,487,564 | Layng | Nov. 8, 1949 |
| 2,634,260 | Carnahan | Apr. 7, 1953 |